United States Patent
Karlstedt

(10) Patent No.: US 12,067,033 B2
(45) Date of Patent: Aug. 20, 2024

(54) ENTITY-RELATIONSHIP EMBEDDINGS

(71) Applicant: DISCORD INC., San Francisco, CA (US)

(72) Inventor: August Karlstedt, Walnut Creek, CA (US)

(73) Assignee: DISCORD INC., San Francisco, CA (US)

(*) Notice: Subject to any disclaimer, the term of this patent is extended or adjusted under 35 U.S.C. 154(b) by 29 days.

(21) Appl. No.: 17/938,747

(22) Filed: Oct. 7, 2022

(65) Prior Publication Data

US 2024/0119066 A1    Apr. 11, 2024

(51) Int. Cl.
*G06F 16/28* (2019.01)
*G06F 16/901* (2019.01)
*G06N 20/00* (2019.01)

(52) U.S. Cl.
CPC ........ *G06F 16/285* (2019.01); *G06F 16/9024* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2014/0108308 A1* | 4/2014 | Stout | G06Q 30/0241 706/20 |
| 2014/0337175 A1* | 11/2014 | Katzin | G06Q 20/326 705/26.62 |
| 2016/0188600 A1* | 6/2016 | Owens | G06Q 30/02 707/734 |
| 2017/0093894 A1* | 3/2017 | Dubrovsky | G06F 21/562 |
| 2020/0364727 A1* | 11/2020 | Scott-Green | G06Q 50/265 |

FOREIGN PATENT DOCUMENTS

CN    114003803 A  *  2/2022

* cited by examiner

*Primary Examiner* — Hosain T Alam
*Assistant Examiner* — Anthony G Gemignani
(74) *Attorney, Agent, or Firm* — Polsinelli PC

(57) ABSTRACT

The present technology utilizes data about diverse types of entities to inform machine learning models. The present technology can ingest social network data that includes nodes from diverse entity types, and utilize information implicit in relationships between one entity type with another entity type. The present technology creates a plurality of embedding spaces for representing entities of different types as vectors. The vectors identify a first entity, a second entity, and a relationship between the entities. The data from the embedding spaces can be input into a model configured to classify entities as likely to be associated with an explored characteristic, and output of a classification of entities that are likely associated with the explored characteristic. The model is configured to relate the different types of entities to classify entities as likely to be associated with the explored characteristic.

17 Claims, 10 Drawing Sheets

ENTITY-RELATIONSHIP EMBEDDINGS

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. While social networks can provide entertainment, networking, commercial, or informational value, they are also subject to various challenges. For example, some users might use a social networking platform to run scams. Some social networking platform users might make insensitive, intentionally offensive, or abusive comments. Accordingly, social networking platforms need to invest in technologies or people to moderate content. Additionally, users generate a large amount of data. While social networks might make good use of this data, they also need to protect the data and keep their users informed about how such data might be used.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict exemplary embodiments of the disclosure and are not, therefore, to be considered to be limiting of its scope, the principles herein are described and explained with additional specificity and detail through the use of the accompanying drawings in which.

Figure 1:
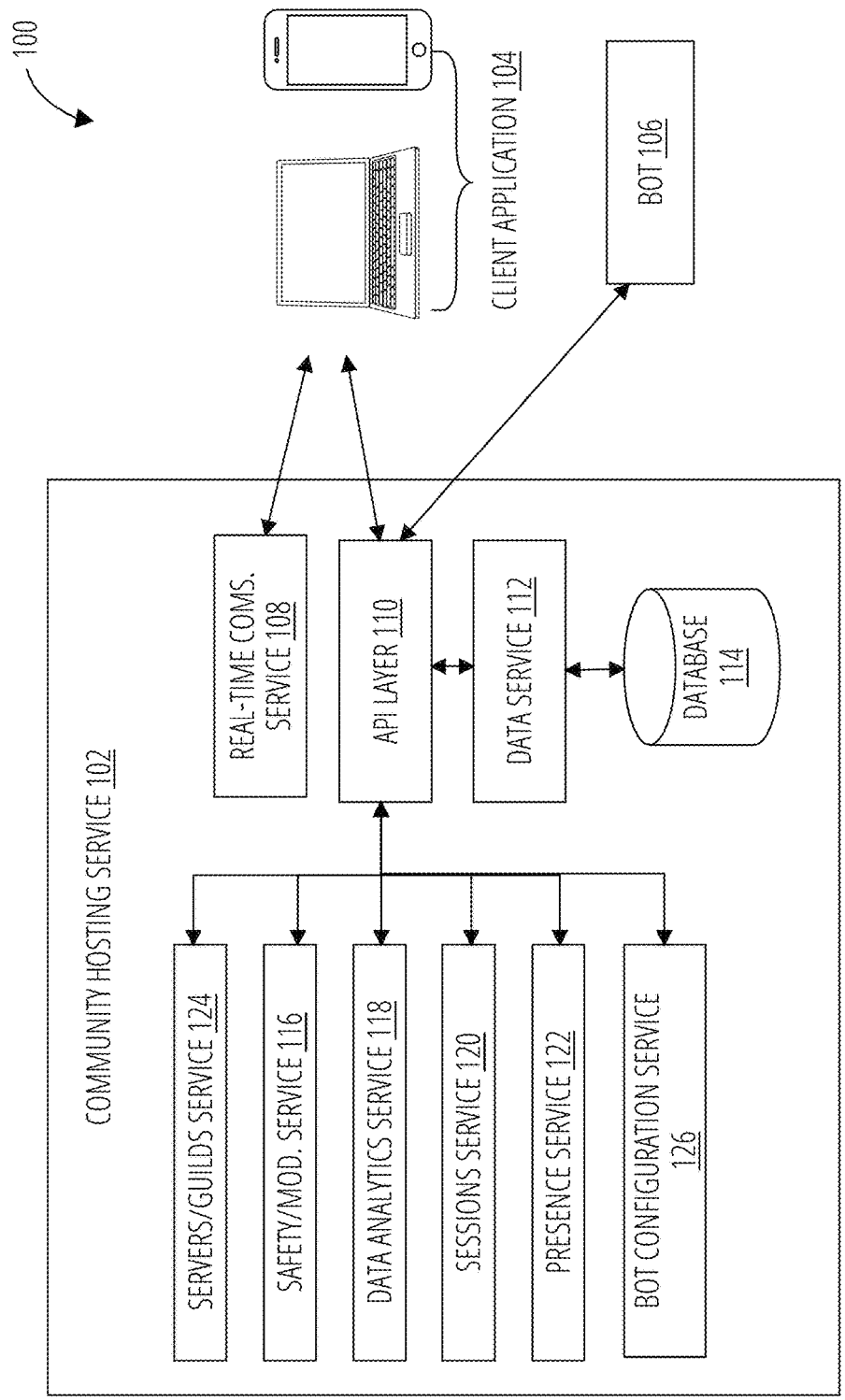
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is for illustration purposes only. A person skilled in the relevant art will recognize that other components and configurations may be used without parting from the spirit and scope of the disclosure.

Additional features and advantages of the disclosure will be set forth in the description which follows, and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by practicing the principles set forth herein.

The disclosed technology addresses the need in the art for utilizing data about diverse types of entities to inform machine learning models. While most social networks are one-dimensional in the types of entities included in the social networks, some social networks can include diverse entities in a social graph. More specifically, most social networks create social graphs that show relationships between only one type of entity—user accounts. In most cases, the social network platform is designed to focus on homogenous relationships, e.g., person-to-person relationships, etc.

However, even these networks get exposed to other entity types, and there is a need to understand the relationships between entity types. For example, a social network platform for professional networking would be exposed to user account entities and organization entities. A social network platform for friendships might also be exposed to a heterogenous graph/network made up of device information, friend groups, other entities, etc.

The present technology can ingest social network data that includes nodes from diverse entity types and utilize information implicit in relationships between one entity type with another entity type. The present technology can embed entities into an embedding space for entities of a first entity type based on information about the relationship the entities of the first type have with entities of other types.

In a more concrete example, a community hosting service (a type of social network platform) might support interactions between user accounts (an entity type) with a community (another entity type). A first user account can be placed in an embedding space based on information about other user accounts to which the first user account is connected and information about communities to which the first user account is connected. Further, the type of relationship the first user account has with the other user accounts of the communities to which the first user account is connected is also important. The first user account might be in a community with a second user account, and the first user account might be a friend with a third user account. Likewise, the first user account might be a member of a first community and an administrator of a second community. The entirety of the social graph, including information about diverse entities and the relationship of the user account to the diverse entities, can be used to place the first user account in the embedding space. Any user account attribute can be used to place the user account in the embedding space.

Similarly, the present technology can place the communities or groups of communities into an embedding space using information about users in the community, the relationship of a user to the community, and even the relationship of one community to another community. Any attribute of the community can be used to place the community in the embedding space.

Using such diverse information to place an entity into an embedding space provides a better location for the entity in the embedding space.

Embedding spaces are sometimes used to place representations of objects that are more similar close together and objects that are less similar farther apart. As a consequence, the better the information about the entities, the better the location of the representations of the entities will be. And a further consequence is that conclusions drawn from the arrangement of the embedding space will be improved.

An additional aspect of the present technology is to use the embedding spaces addressed herein to drive conclusions about some entities. In some embodiments, the present technology uses machine learning algorithms configured to use one or more embedding spaces as an input to drive a conclusion about some entities. In some examples, these conclusions can be used to identify user accounts that are likely to post content that might be inappropriate for some communities, to identify user accounts associated with scams, or to identify communities that have topics that violate the terms and conditions of the social network platform, to identify user accounts that exhibit positive attributes, to identify recommendations, etc.

An additional benefit of the present technology is to utilize conclusions resulting from analyzing the embedding spaces to operate the community hosting service. For example, if a user account is identified as likely to post inappropriate messages, content from the user account may be subject to higher scrutiny by a moderator.

Accordingly, the present technology allows the community hosting service to create a better embedding space, which allows for better conclusions regarding entities and better management of the community hosting service. One particular aspect of the present technology is that it is used to improve the safety and user experience of its users.

Another benefit of the present technology is that the embedding spaces serve as a platform for many types of analysis. The embedding spaces serve as a foundational model upon which other models can be built. The use of the embedding space also adds efficiency and user privacy to the present technology. Any of the ultimate use cases for the present technology could be built to utilize raw data from the community hosting service. However, if each analysis required using the raw platform data, it would require exposing user account data repeatedly and require a large amount of computing resources to process the data each time. The present technology reduces entities to an identifier and a representation in the embedding space and only needs to be created once and then can be used for many use cases. Thus, detailed user data is not needed to be accessed repeatedly, and each use case does not require processing the entire dataset from scratch.

As described herein, one aspect of the present technology is the gathering and use of data available from various sources to improve the delivery of services in support of communities. The present disclosure contemplates that in some instances, this gathered data may include personal information that uniquely identifies or can be used to contact or place a specific person. Such personal information data can include demographic data, location-based data, telephone numbers, email addresses, IDs, home addresses, data or records relating to a user's health or level of fitness (e.g., vital signs measurements, medication information, exercise information), date of birth, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as data collection and/or use changes.

Although the present disclosure broadly covers the use of personal information data to implement one or more various disclosed embodiments, the present disclosure also contemplates that the various embodiments can also be implemented without the need for accessing such personal information data. The various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot configuration service 126 for creating and/or configuring one or more bots 106. The bot configuration service 126 can provide tools and template configurations to configure bots to take on a variety or roles within a channel of a server. The bots 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bot 106 can have their own user account and are authenticated using a token. bot 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
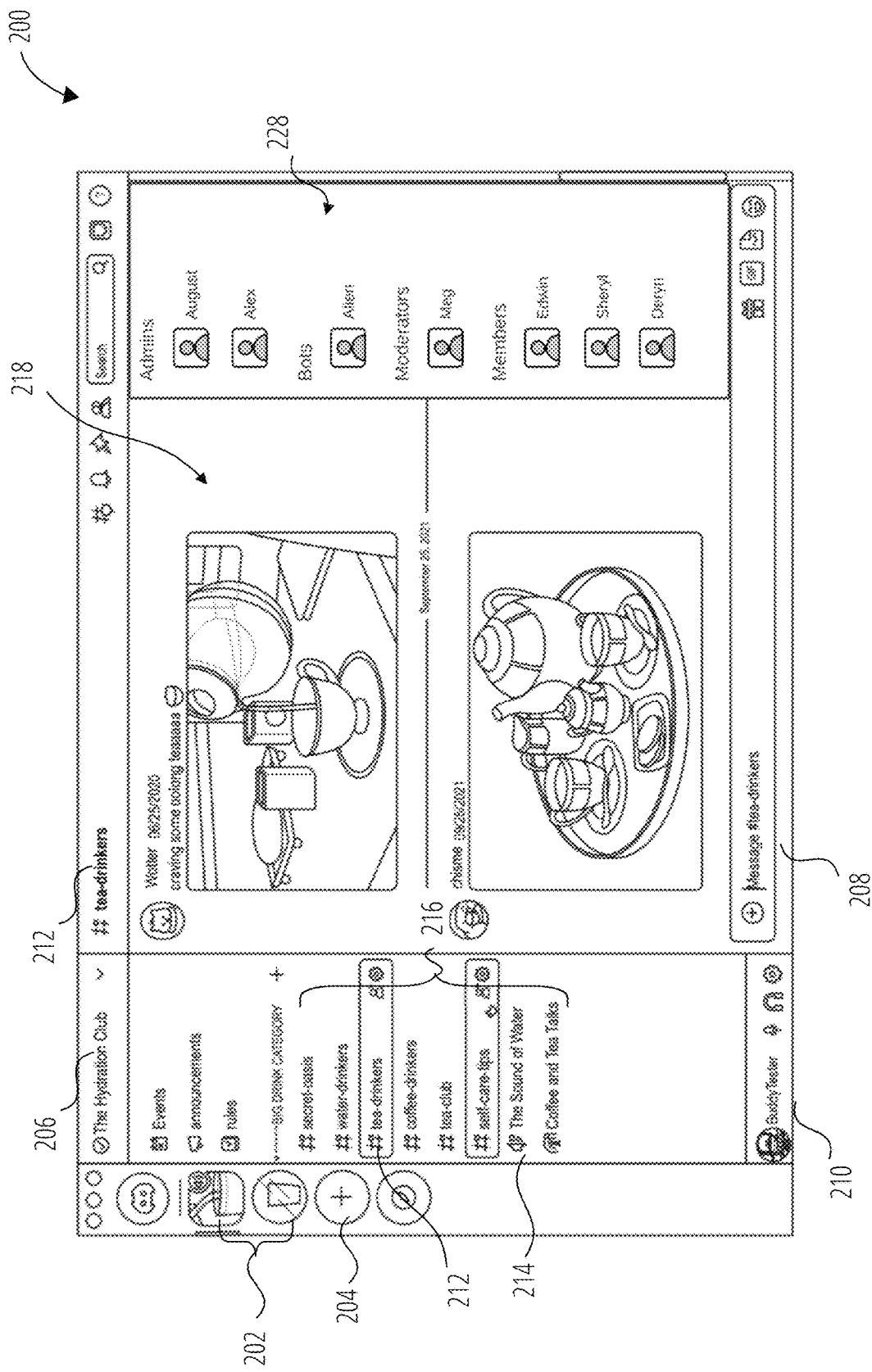
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 216 that are part of the server hydration club server. One of the channels, entitled "tea drinkers" 212 is a non-real-time messaging channel. The message thread within the "tea drinkers" 214 channel can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

User interface 200 also includes a group members panel 228 that can present a roster of members belonging to the currently displayed channel (tea drinkers). As illustrated in FIG. 2A the group members panel 228 can organize the list the members of the channel by their role in the channel. For example, the group members panel 228 shows members of the channel in roles of "Admins" (administrators or owners of the channel or server), bots (e.g. Bots 106), moderators (members with permissions and authority to moderate content posted in the channel), and members (user accounts that can at least read the content of the channel and may be able to post or perform additional actions depending on the configuration of the channel). In some embodiments, the members in the members panel will only be displayed when they have an active session with the channel or with the community hosting service 102. For example the presence service 122 can cause the group members panel 228 to show which members are active in the server or channel. In some embodiments, all members of the channel can be listed in the group members panel 228 and an indication next to their avatar and user name can indicate whether they have an active session. While group members panel 228 illustrates some example roles such as admins, bots, moderators, and members, such roles should not be considered limiting; more or less roles may exist for a channel or server.

Figure 2B:
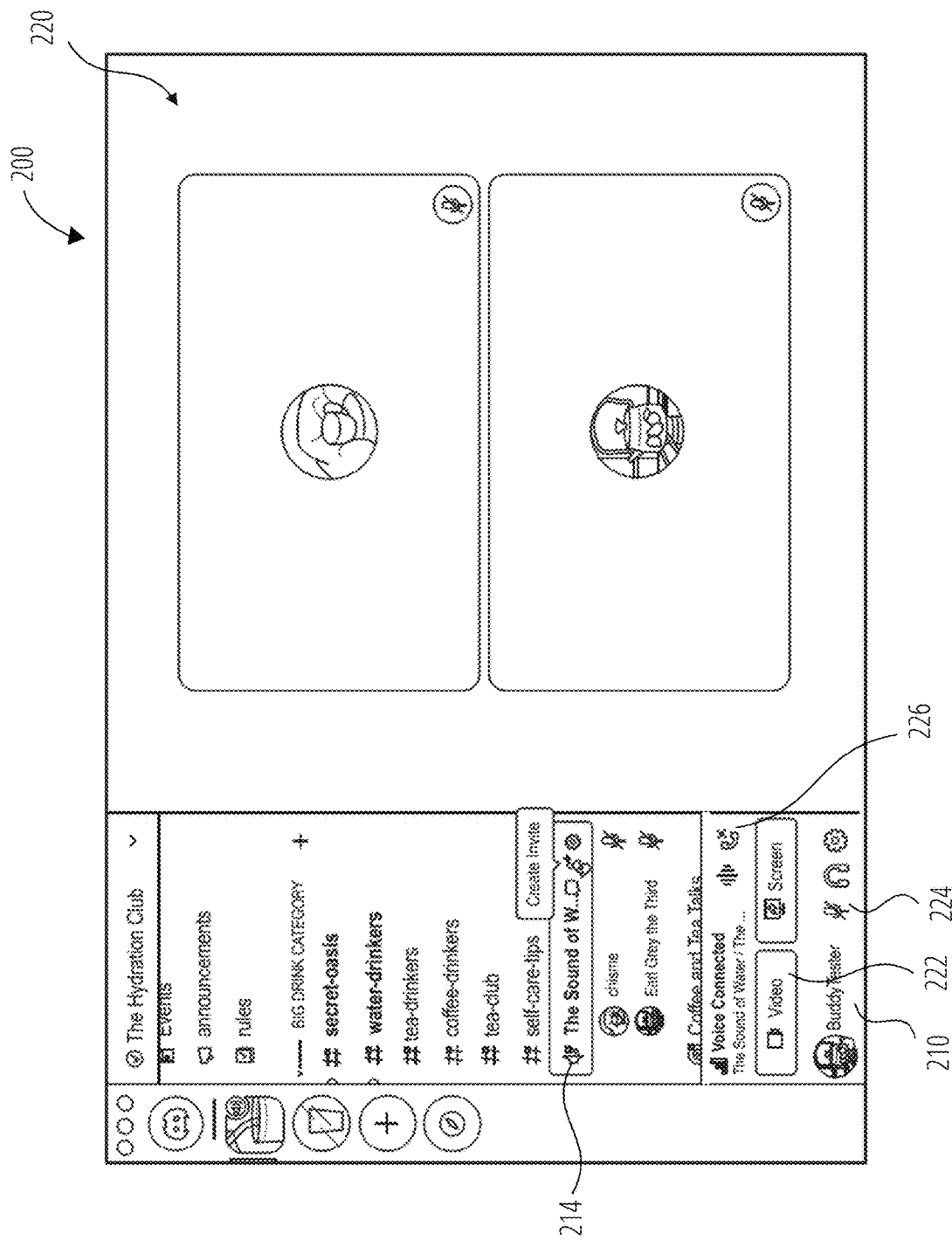
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
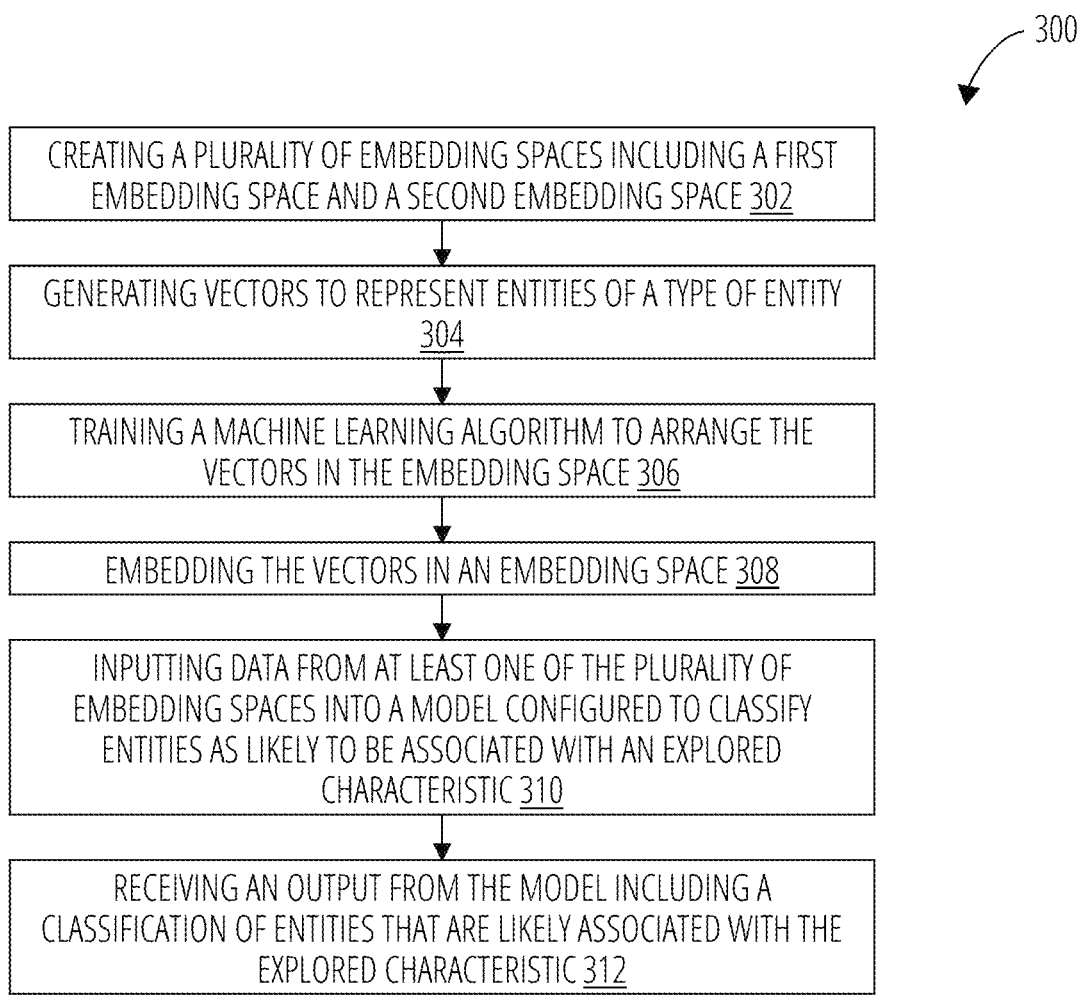
FIG. 3 illustrates an example method for embedding a plurality of different types of entities related to each other in a social graph in embedding spaces, and using the embeddings to as an input to a machine learning model to identify entities associated with an explored characteristic in accordance with some aspects of the present technology.

FIG. 3 illustrates an example method 300 for embedding a plurality of different type s of entities related to each other in a social graph in embedding spaces and using the embeddings as an input to a machine learning model to identify entities associated with an explored characteristic. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes creating a plurality of embedding spaces, including a first embedding space and a second embedding space at block 302. For example, the data analytics service 118 illustrated in FIG. 1 may create a plurality of embedding spaces, including a first embedding space and a second embedding space. The first embedding space includes representations of a plurality of entities of a first entity type. The second embedding space includes representations of a plurality of entities of a second entity type.

Examples of entity types can be user accounts, servers, channels, messages, bots, topics, organizations, friend cohorts, events, or any other entity, grouping, or category. Each entity type can be associated with a variety of metadata pertaining to relationships with other entities, more detail about the character of the entity (e.g., if the entity is a user, what roles do they have in the servers to which they are members, or if the entity is a server, what topic category is the server associated with, etc.) For example, a community hosting service might support interactions between user accounts (an entity type) with a server (another entity type). A first user account can be placed in an embedding space based on information about other user accounts to which the first user account is connected and based on information about channels to which the first user account is connected. Further, the type of relationship the first user account has with the other user accounts to which the first user account is connected is also important. The first user account might be in a channel with a second user account, and the first user account might be a friend with a third user account. Likewise, the first user account might be a member of a first channel and an administrator of a second channel. The relationships between an entity type with another entity type can be embodied in metadata associated with the entity types. In some instances, some relationship information can be embodied in a social graph connecting entity types.

The social graph for the first user account, including information about the identification of entities in the social graph, and the relationship between the entities, can be used to place the first user account in the embedding space. The entities can be of diverse types. Any user account attribute can be used to place the user account in the embedding space.

According to some examples, the method includes generating vectors to represent entities at block 304. For example, the data analytics service 118 illustrated in FIG. 1 may generate vectors to represent the entities. A single vector is generated to represent respective individual entities. For example, if the embedding space includes user account entities, vectors can be prepared to represent a first user account, a second user account, . . . and an $n^{th}$ user account.

The vector may include a plurality of relationships that pertain to the social graph of the entity. Each relationship can be represented by one or more vectors where a first vector can identify a first entity, a second vector can identify a second entity, and a third vector can represent a relationship between the entities. For example, the data analytics service 118 may represent an entity as a one or more vectors including a vector that identifies the entity, a vector that identifies another entity, and a vector that represents the entity's relationship to the another entity.

More specifically, each relationship in a vector (multiple such relationships can be included in a vector) representing the entity is prepared into a (h, r, t) triplet form, where h=head, r=relation, and t=tail.

Examples of (h, r, t) triples include:

| head | relation | tail | explanation |
|---|---|---|---|
| user account | in channel | channel | A user account is a member of the channel |
| user account | is friend | user account | A first user account is a friend with a second user account |
| server | has channel | channel | A server includes the channel |
| user account | in server | server | A user account has a relationship to a server they are a member of. |

In some embodiments, the entities of the head and tail, and the relationship between the head and tail can all be represented numerically. Accordingly, an example h,r,t triplet in a vector can look like: (h, r, t)=(661027446241361930, 19, 281683040739262465), where this particular example is the edge between a first user ID and the server ID. Relation 19 is the user_in_server relation. Some other relations can include: accept_friend_request, accept_invite affinity, bot_application_description, bot_has_role, bot_in_server, channel_has_name, channel_has_parent, channel_is_type, connect_to_integration, create_server, discoverable_server_categories, discoverable_server_words, server_has_role, server_role_has_name, server_role_has_permission_level, has_channel, public_server_description, sent_friend_request, upload_virus, user_has_role, user_in_discoverable_server, user_in_server, and user_subscription.

According to some examples, the method includes training a machine learning algorithm to arrange the vectors in an embedding space at block 306. For example, the data analytics service 118 illustrated in FIG. 1 may train a machine learning algorithm configured to arrange the vectors. In some embodiments, the machine learning algorithm can be an unsupervised machine learning algorithm. In some embodiments, the machine learning algorithm for arranging the vectors in the embedding space can be a supervised machine learning model. The machine learning algorithm can be more than one machine learning algorithm.

In some embodiments, the machine learning algorithm is an unsupervised machine learning algorithm that can be configured to arrange the embedding space to optimize for a parameter. For example, the parameter can be optimized by one of a ranking loss parameter, a logistic parameter, or a softmax parameter. The unsupervised machine learning algorithm can be an unsupervised contrastive learning algorithm.

A different machine learning algorithm may be needed for the different embedding spaces and/or to translate between two different embedding spaces. The machine learning algorithms can place vectors in an embedding space based on the vector information itself, metadata associated with an entity referenced by a vector, and based on information from other embedding spaces such as when an entity referenced by a vector is present in another embedding space. In some embodiments, the arrangement of vectors in one embedding space for one entity type is interdependent on the arrangement of vectors in a second embedding space for a second entity type. This is because characteristics of a server are based on topics, and user accounts associated with a server (among other metadata attributes), and characteristics of a user are based on topics and servers to which the user is associated (among other metadata attributes). Accordingly, a first machine learning algorithm might arrange a first embedding space, a second machine learning algorithm might arrange a second embedding space, and a third machine learning algorithm might learn to translate from a first embedding space to a second embedding space (e.g., translate from a user in a user entity type embedding space to a location in a server entity type embedding space which location indicates servers to which the user would likely be a member) and the first machine learning algorithm and second machine learning algorithm might utilize the third machine learning algorithm as an input.

In an example, the parameter is optimized by ranking loss which is a triplet margin loss that optimizes related entities to be nearby each other in their embedding space. By related, it is meant that the entities of the same type have similar relations (r) to entities (t) in common.

In an example, training a machine learning algorithm to place a vector that includes the relationship between a first user ID (head ID) that is in the server (relation ID) with the server ID (tail ID) in the embedding space includes two embedding lookups: one for the embedding of the first user ID and the other for the embedding of the server ID. The relation ID is used to choose which machine learning model to use to transform the entities into the same embedding space since the vector defines the entity based on a relationship between heterogenous data. For example, the model for this relation ID can be $f_r(\theta_x, \theta_y) = c(\theta_x, g_r(\theta_y))$ where $f_r$=scoring function, $\theta_x$=embedding for h (head) entity, $\theta_y$=embedding for t (tail) entity, c=comparator such as dot product, cosine distance, etc., and $g_r$=transformation such as translation, diagonal multiplication, etc. In instances where entities are classified based on heterogenous data the machine learning algorithms can include a machine learning algorithm that can transform data from one embedding space to another embedding space based on the relationship between the heterogenous data.

To train the model, (h, r, t) triplets are fed to the model to place in the embedding space where some (h, r, t) triplets exist in the dataset (the user ID is actually a member of the server ID), but some (h, r, t) triplets do not exist in the dataset. The triplets that do not exist can be generated randomly to provide negative examples, and the positive (those that do exist in the social graph) and negative examples can be used to calculate a loss where max(0,m−$s_i$+$t_{i,j}$). m=margin parameter (for example, 0.1), si=score for positive example i, $t_{i,j}$=score for negative example $t_{i,j}$ (because there may be j negatives for each positive example).

Once the model is trained to optimize by one of a ranking loss, logistic, or softmax parameters, the model can be used to embed the vectors in an embedding space at block 308. For example, the data analysis service 118 illustrated in FIG. 1 may embed the vectors in an embedding space.

Vectors representing individual entities that are similar are placed closer together than vectors representing individual entities that are less similar. The embedding of the vectors in the embedding space is performed using an unsupervised machine learning algorithm configured to arrange the vectors representing individual entities that are similar closer together than vectors representing individual entities that are less similar.

Similar servers or channel entity types can be clustered together by a nearest neighbor algorithm, such as by computing a MinHash locality sensitive hash (LSH) for each server or channel using their members' user IDs. Servers or channels with members in common will get hashed to collections that, when applying a specialized comparison procedure, evaluate to "true." In another example, similar user accounts can be clustered together by computing a MinHash LSH for each user account using their set of friends or, more generally, their set of connected or affine users, which may include interaction strength and server co-membership.

Once the embedding spaces have been populated with the vectors (block 308), the embedding spaces can be used to derive insights about entities and to investigate certain characteristics.

According to some examples, the method includes inputting data from at least one of the plurality of embedding spaces into a model configured to classify entities as likely to be associated with an explored characteristic at block 310. For example, the data analytics service 118 illustrated in FIG. 1 may input data from at least one of the plurality of embedding spaces into a model configured to classify entities as likely to be associated with an explored characteristic. In some embodiments, the model is a supervised machine learning model.

For example, the method comprises inputting first data from the first embedding space and second data from the second embedding space into the model configured to classify entities. The model is configured to classify entities to relate the plurality of entities of the first entity type to the plurality of entities of the second entity type and to classify entities as likely to be associated with the explored characteristic. In some embodiments, classifying entities that are likely to be associated with the explored characteristic includes outputting a probability that a respective entity is associated with the explored characteristic. In some embodiments, classifying entities that are likely to be associated with the explored characteristic includes outputting a binary conclusion that a respective entity is likely associated with the explored characteristic or not likely associated with the explored characteristic.

According to some examples, the method includes receiving an output from the model including a classification of entities that are likely associated with the explored characteristic at block 312. For example, the data analytics service 118 illustrated in FIG. 1 may receive an output from the model including a classification of entities that are likely associated with the explored characteristic.

Figure 4:
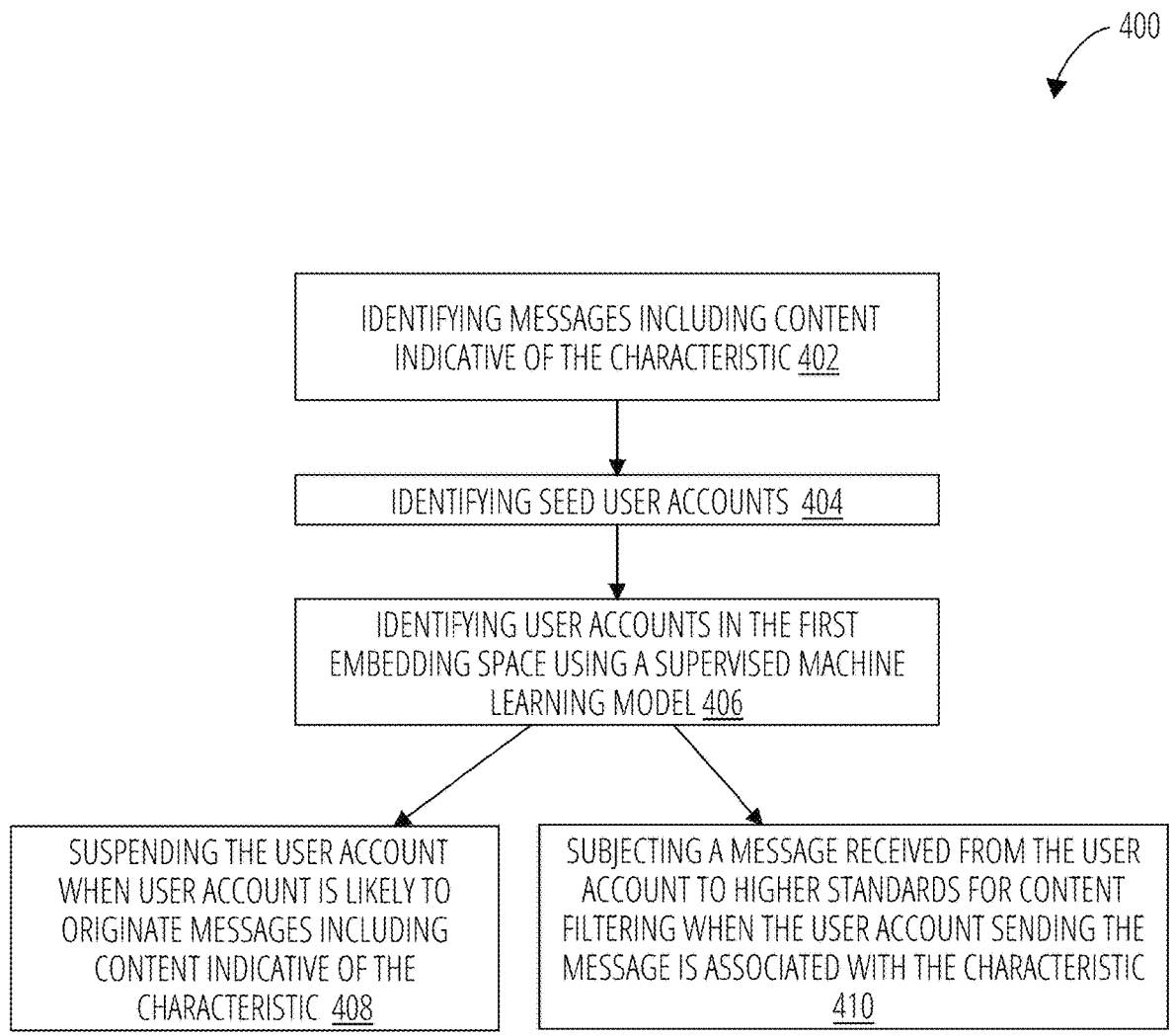
FIG. 4 illustrates an example method for identifying messages including content indicative of an explored characteristic based on a similarity to other messages known to exhibit the explored characteristic in accordance with some aspects of the present technology.

FIG. 4 illustrates an example method 400 for identifying messages including content indicative of an explored characteristic based on similarity to other messages known to exhibit the explored characteristic. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes identifying messages including content indicative of an explored characteristic at block 402. For example, the data analytics service 118 illustrated in FIG. 1 may identify messages including content indicative of the characteristic. The data analytics service 118 is configured to identify user accounts associated with a user that is associated with an explored characteristic. In some embodiments, the explored characteristic is that the user originates messages reflecting an intent to self-harm. In some embodiments, the explored characteristic is that the user originates messages subject to content moderation rules. The explored characteristic is not limited to negative attributes. The explored characteristic could be a message on a topic, for example. The data analytics service 118 can identify the messages through manual tagging by moderators, users accounts in the community, algorithms, or heuristics.

According to some examples, the method includes identifying seed user accounts at block 404. For example, the data analytics service 118 illustrated in FIG. 1 may identify seed user accounts. A seed user account is one in which a number of messages originating from a respective user account including content indicative of the characteristic is greater than a threshold number of messages.

According to some examples, the method includes training a machine learning model to identify user accounts in the first embedding space that are similar to the seed user accounts. In some embodiments, the machine learning model can be a supervised machine learning model, but that machine learning model might make use of one or more of the unsupervised machine learning algorithms described above that can translate across embeddings spaces for different entity types so that information from the heterogeneous embedding spaces can inform the supervised machine learning model in identifying user accounts similar to the seed user account as it pertains to the explored characteristic.

According to some examples, the method includes identifying user accounts in the first embedding space using the supervised machine learning model at block 406. For example, the data analytics service 118 illustrated in FIG. 1 may identify user accounts in the first embedding space using the supervised machine learning model. The first embedding space is a representation of the user account entity type.

According to some examples, the method includes suspending the user account when the user account is likely to originate messages including content indicative of the characteristic at block 408. For example, the data analytics service 118 illustrated in FIG. 1 may suspend the user account when the user account is likely to originate messages including content indicative of the characteristic.

According to some examples, the method includes subjecting a message received from the user account to higher standards for content filtering when the user account sending the message is associated with the characteristic at block 410. For example, the 118 illustrated in FIG. 1 may subject a message received from the user account to higher standards for content filtering when the user account sending the message is associated with the characteristic.

Figure 5:
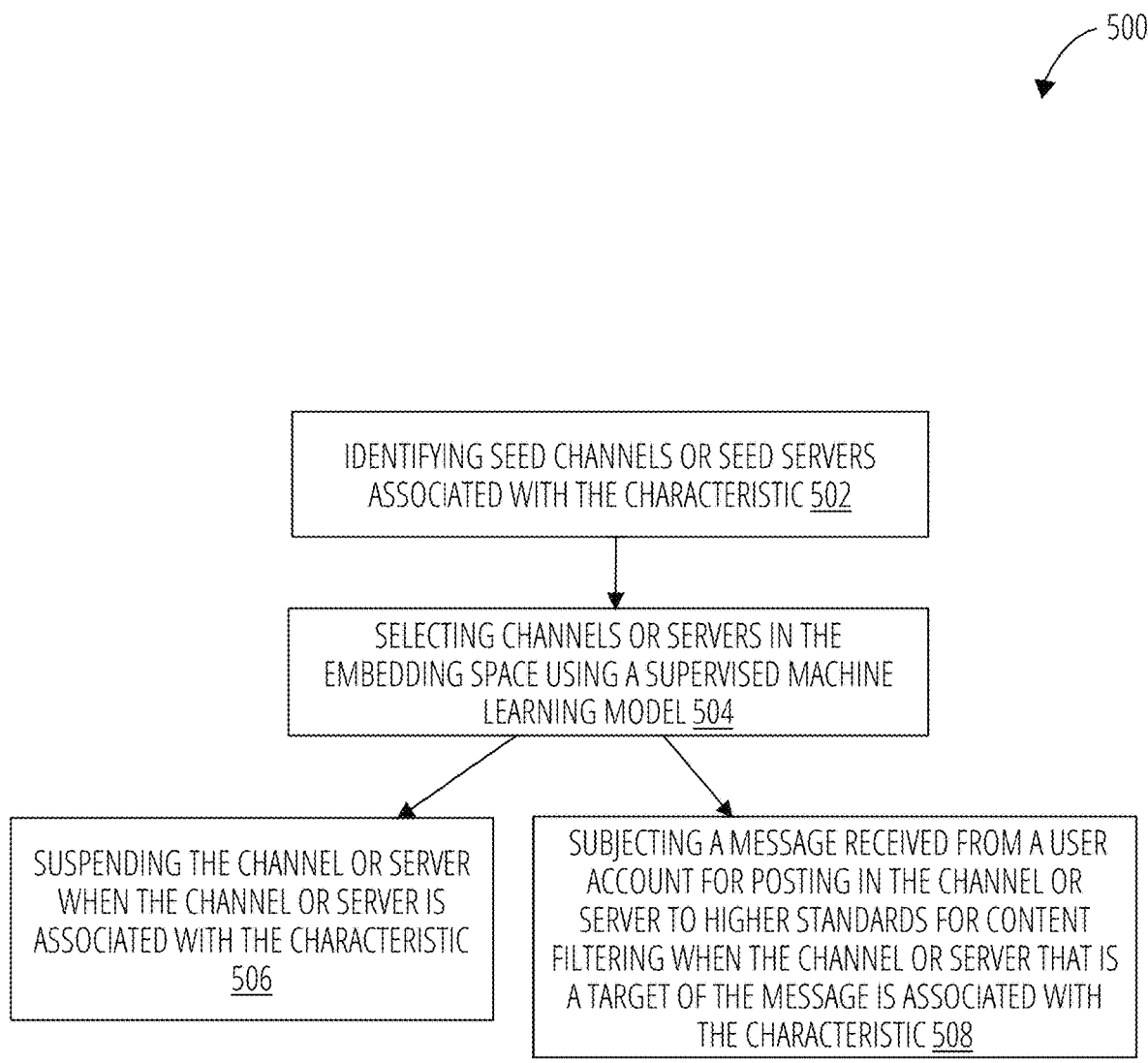
FIG. 5 illustrates an example method for identifying messages including content indicative of an explored characteristic based on their inclusion in a channel known to include messages that exhibit the explored characteristic in accordance with some aspects of the present technology.

FIG. 5 illustrates an example method 500 for identifying messages including content indicative of an explored characteristic based on their inclusion in a channel known to include messages that exhibit the explored characteristic. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes identifying seed channels or seed servers from those associated with the explored characteristic at block 502. For example, the data analytics service 118 illustrated in FIG. 1 may identify seed channels or seed servers associated with the explored characteristic. The data analytics service 118 is configured to identify user accounts associated with a user that is associated with an explored characteristic. In some embodiments, the explored characteristic is that the user originates messages reflecting an intent to self-harm. In some embodiments, the explored characteristic can be that the channel or server is related to a topic. For example, the channel or server receives messages associated with self-harm, bullying, hate speech, spam, scams, etc. The data analytics service 118 can identify the servers or channels through manual tagging by moderators, users accounts in the community, algorithms, or heuristics.

According to some examples, the method includes training a machine learning model to identify servers or channels in the first embedding space that are similar to the seed servers or channels. In some embodiments, the machine learning model can be a supervised machine learning model, but that machine learning model might make use of one or more of the unsupervised machine learning algorithms described above that can translate across embeddings spaces for different entity types so that information from the heterogeneous embedding spaces can inform the supervised machine learning model in identifying servers or channels similar to the seed user account as it pertains to the explored characteristic.

According to some examples, the method includes selecting channels or servers in the embedding space at block 504. For example, the data analytics service 118 illustrated in FIG. 1 may select channels or servers in the embedding space that are proximate to the seed channels or servers using the supervised machine learning model. In some embodiments, the embedding space is a representation of the channel or the server entity type.

According to some examples, the method includes suspending the selected channel or server when the selected channel or server is associated with the characteristic at block 506. For example, the data analytics service 118 illustrated in FIG. 1 may suspend the selected channel or server when the selected channel or server is associated with the characteristic. The data analytics service 118 can conclude that the selected channel or server is associated with the explored characteristic because it is placed proximate to other servers or channels that are known to be associated with the explored characteristic. Since the embedding space arranges similar entities closer together in the embedding space, it can be concluded that an entity is similar to the entities to which it is closest in the embedding space.

According to some examples, the method includes subjecting a message received from a user account for posting in the channel or server to higher standards for content filtering when the channel or server that is a target of the message is associated with the characteristic at block 508. For example, the data analytics service 118 illustrated in FIG. 1 may subject a message received from a user account for posting in the channel or server to higher standards for content filtering when the channel or server that is a target of the message is associated with the characteristic. When the data analytics service 118 concludes that the server or channel receiving the message receives a lot of messages (relative to other channels or servers) that exhibit the explored characteristic, the data analytics service 118 or safety/moderation service 116 might consider all messages being posted to the channel or server to have a higher likelihood of also exhibiting the explored characteristic. When the explored characteristic is one that might be subject to content moderation or safety filtering (e.g., messages associated with self-harm, bullying, hate speech, spam, scams, etc.), the safety/moderation service 116 might subject these messages to higher standards for content filtering or moderation.

Figure 6:
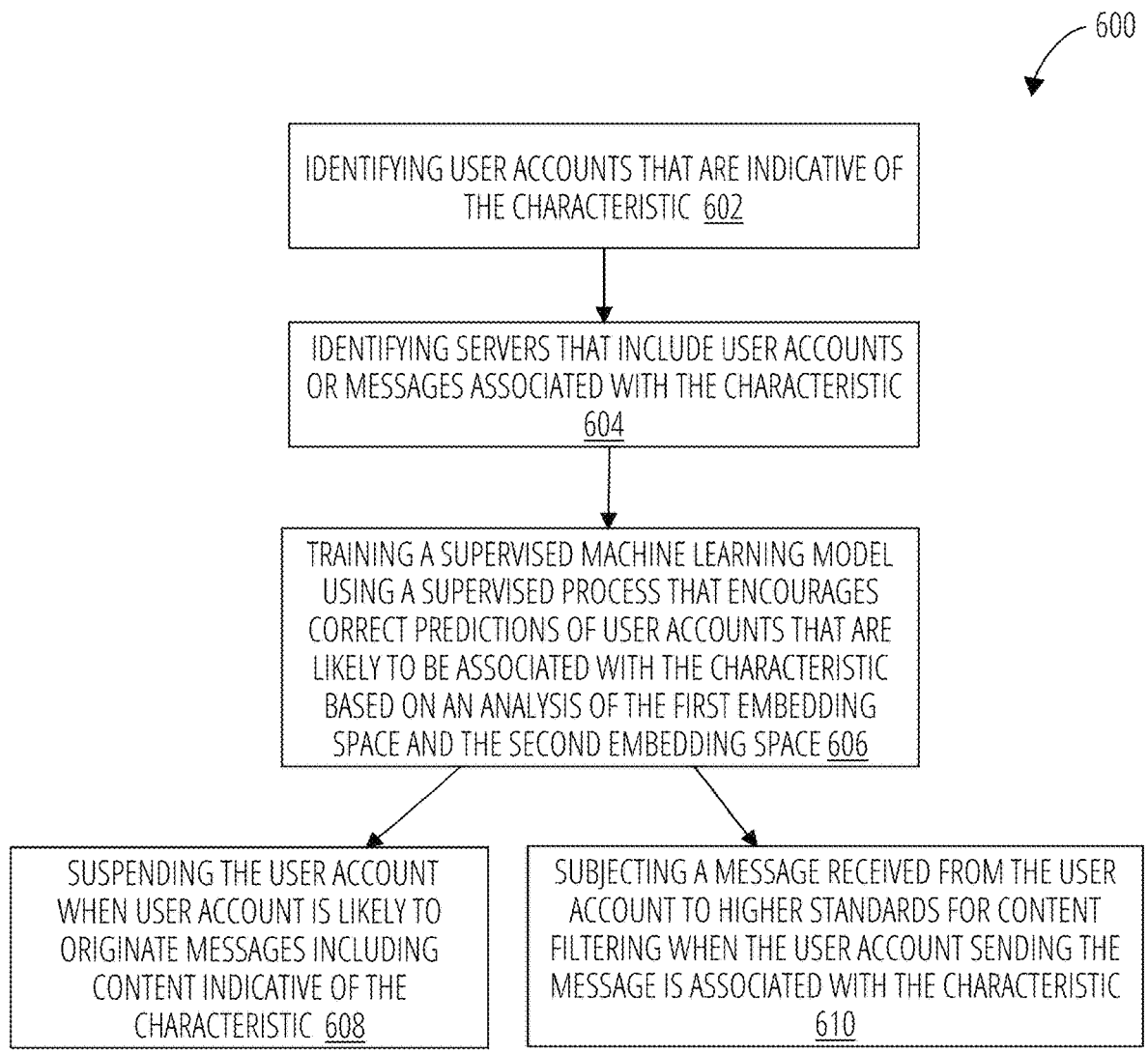
FIG. 6 illustrates an example method for utilizing a machine learning model that analyzes embedding spaces for diverse entity types to classify a user account as being associated with an explored characteristic in accordance with some aspects of the present technology.

FIG. 6 illustrates an example method 600 for utilizing a machine learning model that analyzes embedding spaces for diverse entity types to classify a user account as being associated with an explored characteristic. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method includes identifying user accounts indicative of the characteristic at block 602. For example, the data analytics service 118 illustrated in FIG. 1 may identify user accounts indicative of the explored characteristic. In some embodiments, services of the community hosting service 102 might learn of messages associated with the explored characteristic. The services might learn of these messages through reporting by user accounts or other algorithms or heuristics utilized to identify messages associated with the explored characteristic. From these messages, it can be determined that some user accounts have originated a relatively high number (e.g., a standard deviation greater than the average user account) of such messages, and thereby it can be concluded that the user originates messages associated with the explored characteristic. In some embodiments, the explored characteristic is messages reflecting an intent to self-harm or messages subject to content moderation rules.

According to some examples, the method includes identifying servers that include user accounts or messages associated with the explored characteristic at block 604. For example, the data analytics service 118 illustrated in FIG. 1 may identify servers that include user accounts or messages associated with the characteristic.

According to some examples, the method includes training a supervised machine learning model using a supervised process that encourages correct predictions of user accounts that are likely to be associated with the characteristic based on an analysis of the first embedding space and the second embedding space at block 606. For example, the data analytics service 118 illustrated in FIG. 1 may train a supervised machine learning model using a supervised process that encourages correct predictions of user accounts that are likely to be associated with the characteristic based on an analysis of the first embedding space and the second embedding space.

According to some examples, the method includes suspending the user account when the user account is likely to originate messages including content indicative of the characteristic at block 608. For example, the data analytics service 118 illustrated in FIG. 1 may suspend the user account when the user account is likely to originate messages including content indicative of the characteristic.

According to some examples, the method includes subjecting a message received from the user account to higher standards for content filtering when the user account sending the message is associated with the characteristic at block 610. For example, the data analytics service 118 illustrated in FIG. 1 may subject a message received from the user account to higher standards for content filtering when the user account sending the message is associated with the characteristic.

Figure 7:
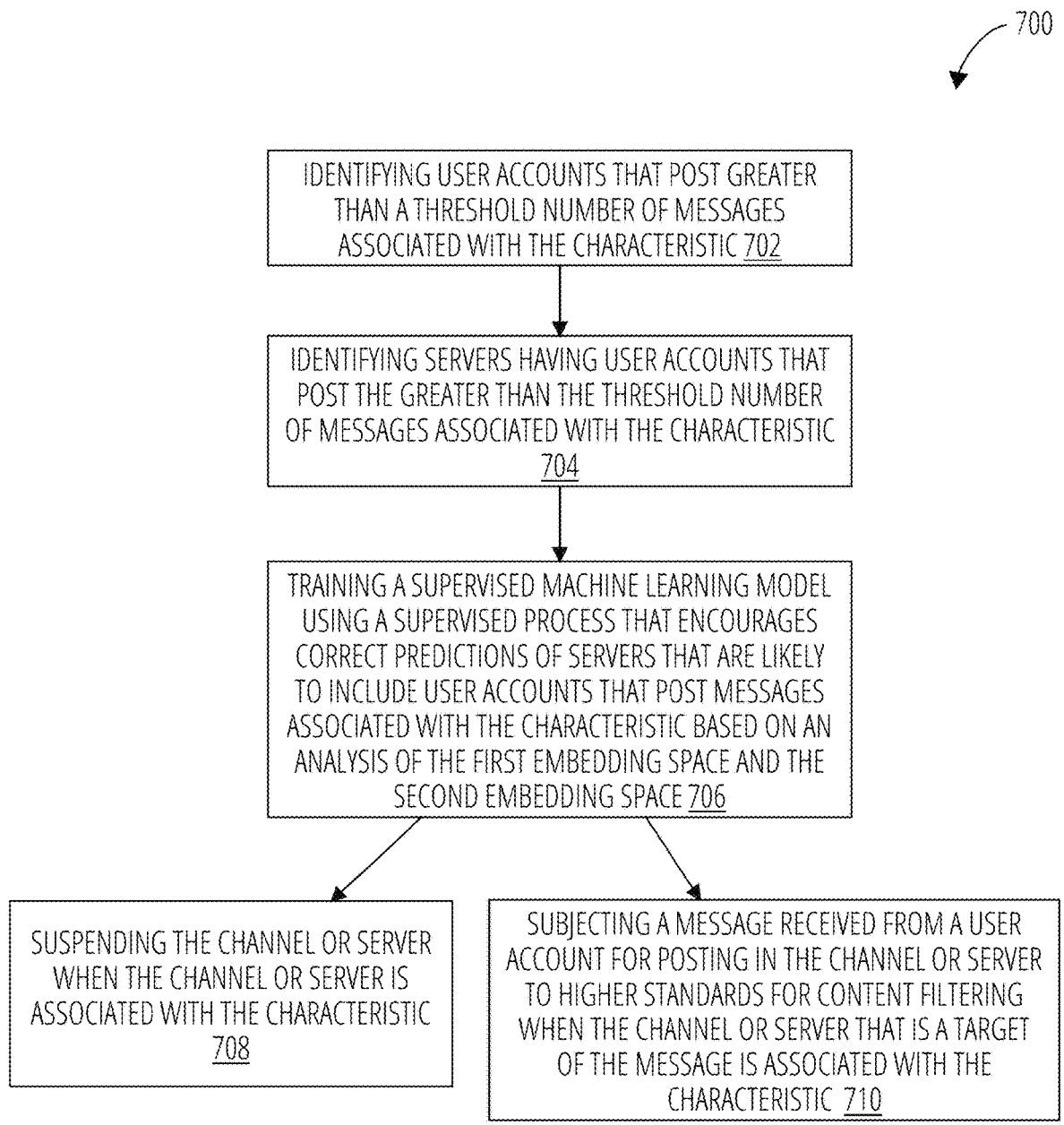
FIG. 7 illustrates an example method for utilizing a machine learning model that analyzes embedding spaces for diverse entity types to classify a server or channel as being associated with an explored characteristic in accordance with some aspects of the present technology.

FIG. 7 illustrates an example method 700 for utilizing a machine learning model that analyzes embedding spaces for diverse entity types to classify a server or channel as being associated with an explored characteristic. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method includes identifying user accounts that post greater than a threshold number (e.g., a standard deviation greater than the average user account) of messages associated with the characteristic at block 702. For example, the data analytics service 118 illustrated in FIG. 1 may identify user accounts that post greater than a threshold number of messages associated with the characteristic. The model is configured to identify channels or servers that have user accounts that are likely to post messages associated with a characteristic. The characteristic is that the channel or server is related to a topic. The characteristic is that the channel or server receives messages associated with self harm.

According to some examples, the method includes identifying servers with user accounts that post more than the threshold number of messages associated with the characteristic at block 704. For example, the data analytics service 118 illustrated in FIG. 1 may identify servers having user accounts that post greater than the threshold number of messages associated with the characteristic.

According to some examples, the method includes training a supervised machine learning model using a supervised process that encourages correct predictions of servers that are likely to include user accounts that post messages associated with the characteristic based on an analysis of the first embedding space and the second embedding space at block 706. For example, the data analytics service 118 illustrated in FIG. 1 may train a supervised machine learning model using a supervised process that encourages correct predictions of servers that are likely to include user accounts that post messages associated with the characteristic based on an analysis of the first embedding space and the second embedding space.

According to some examples, the method includes suspending the channel or server when the channel or server is associated with the characteristic at block 708. For example, the data analytics service 118 illustrated in FIG. 1 may suspend the channel or server when the channel or server is associated with the characteristic.

According to some examples, the method includes subjecting a message received from a user account for posting in the channel or server to higher standards for content filtering when the channel or server that is a target of the message is associated with the characteristic at block 710. For example, the data analytics service 118 illustrated in FIG. 1 may subject a message received from a user account for posting in the channel or server to higher standards for content filtering when the channel or server that is a target of the message is associated with the characteristic.

EXAMPLE 1

Discover Abusive Users (User Accounts that Post Messages Relating to Self-Harm)

Use messages reported as those related to self-harm as a labeled set to train a supervised machine learning model to score messages as being related to self-harm messages. Select messages output by the trained supervised machine learning model with a score (score >0.9) that strongly indicates the message is related to self-harm.

Identify users with greater than a threshold number (greater than 10) of self-harm messages and place those users as seed users in the user account embedding space. Find the nearest neighbors of the seed users in the embedding space and label them as users with the potential to post self-harm messages.

While the above example looks at a class of abusive users (self-harm users), other classes of users such as hate speech or spam can also be used.

The above example might also be useful, in general, to add a signal to some user profiles for increased scrutiny for other types of abusive content, even if there is not currently a classification for that type of abusive content.

EXAMPLE 2

Discover Spam Users (User Accounts that Post Spam Messages)

Use messages reported as spam as a labeled set to train a supervised machine learning model to score messages as spam messages. Select messages output by the trained supervised machine learning model with a score (score >0.9) that strongly indicates the message is spam.

Identify users with greater than a threshold number (greater than 20) of spam messages and place those users as seed users in the user account embedding space. Find the nearest neighbors of the seed users in the embedding space and label them as users with the potential to post spam messages.

EXAMPLE 3

Discover Servers that Include Hate Speech Messages

Use messages reported as being hate speech as a labeled set to train a supervised machine learning model to score messages as being hate speech. Select messages output by the trained, supervised machine learning model with a score (score >0.9) that strongly indicates the message is hate speech.

Identify servers with greater than a threshold number (greater than 10) of hate speech messages and place those servers as seed servers in the server embedding space. Find the nearest neighbors of the seed servers in the embedding space and label them as servers with the potential to include hate speech messages.

EXAMPLE 4

Discover Servers that Include Spam Messages

Use messages reported as spam as a labeled set to train a supervised machine learning model to score messages as being spam. Select messages output by the trained supervised machine learning model with a score (score >0.9) that strongly indicates the message is spam.

Identify servers with more than a threshold number (greater than 10) of spam messages and place those servers as seed servers in the server embedding space. Find the nearest neighbors of the seed servers in the embedding space and label them as servers with the potential to include spam messages.

EXAMPLE 5

Use of Information about Servers with the Potential to Receive Spam/Hate Speech Messages Modify an existing algorithm for detecting spam or hate speech to include inputs about how likely a server is to receive spam/hate speech messages to improve the identification of spam/hate speech messages.

EXAMPLE 6

Use of Known Category Information for a Subset of Servers to Impute Category Information to Servers with Unknown Category Information Use known information about servers including categories of a server explicitly provided by the server owner to train a server category prediction model to predict the probability that a server is associated with one or more categories. There are more than 20 categories to associate with a server.

The server category prediction model is trained on public servers.

User the server category predictions to impute category information to servers for which category information might not be able to be predicted (private servers) by identifying a server with unknown categories in the embedding space and inputting characteristics from servers placed nearby in the embedding space.

Other examples: The examples addressed above should not be considered limiting, and are for explanation purposes only. For example, a further non-limiting set of example use cases could be to predict what a given server is used for, e.g. friend group, large community, shared interest, or creators looking to generate revenue. Another example use-case, is a model that predicts user age, i.e. is the user 13-17, 18-24, 25-34, 35-44, or 45+.

Figure 8:
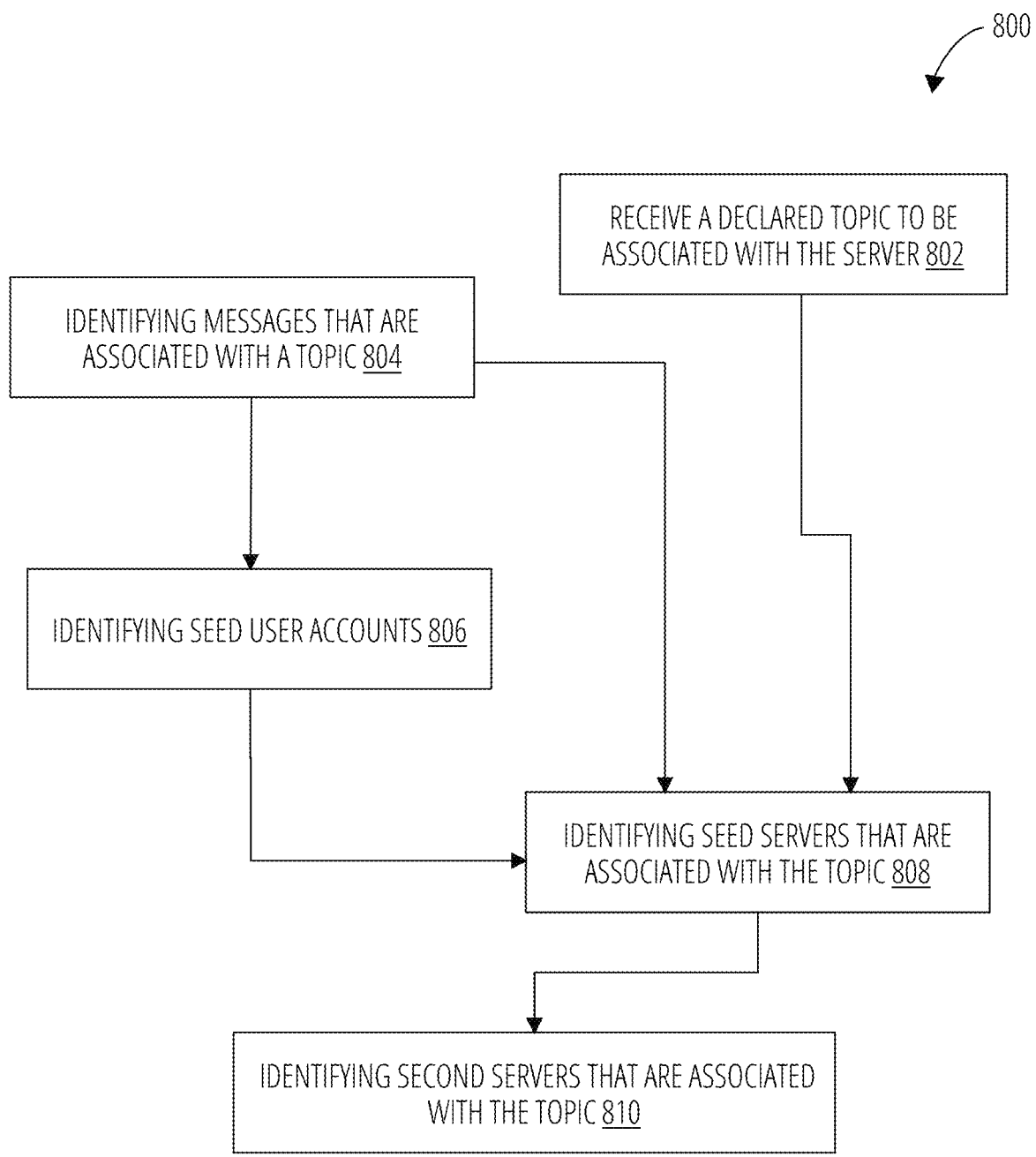
FIG. 8 illustrates an example method 800 for identifying servers that are associated with an explored characteristic such as a topic in accordance with some aspects of the present technology.

FIG. 8 illustrates an example method 800 for identifying servers that are associated with an explored characteristic such as a topic. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

In some examples, it can be desired to locate servers that are associated with a particular explored characteristic such as a topic. For instance, if a user account is interested in a topic, it can be useful to recommend the other servers that pertain to the same topic. Additionally, it can be useful to have more complete data about servers in general and this can include labeling servers with topics. While owners might explicitly label their servers as belonging to a particular category some owners might not label their servers with any category. Additionally, even owners that label their servers with a category might provide a broad category while the actual topic of the server within that category might be more refined. Furthermore, a topic of a server might drift or change over time, and thus, even declared categories or declared topics might be incorrect or not precise.

According to some examples, the method includes receiving a declared topic to be associated with a server at block 802. For example, the data analytics service 118 illustrated in FIG. 1 may receive a declared topic to be associated with a server. A service might be associated with a declared topic when a user account sets up the server using the servers/guilds service 124. Typically, the user account is given an option to associate the server with at least one of a range of common categories. If the topic matches one of these categories, or if the topic has been otherwise explicitly associated with the server by the user account the topic was declared by the user account.

Many servers are a forum for undeclared topics. As noted above, some servers are not associated with any category, and even servers that are associated with a category might be a forum for more refined topics, or the topics might change since a topic was last declared. Therefore, according to some examples, the method includes identifying messages that are associated with a topic at block 804. For example, the data analytics service 118 illustrated in FIG. 1 may identify messages that are associated with a topic. A natural language processing service might analyze messages to associate the messages with a topic, or the messages might be associated with a declared topic when a user associates a tag, such as a hashtag with the message.

According to some examples, the method includes identifying user accounts that post greater than a threshold number (e.g., a standard deviation greater than the average user account) of messages associated with the topic at block 806. For example, the data analytics service 118 illustrated in FIG. 1 may identify user accounts that post greater than a threshold number of messages associated with the topic and consider these user accounts as seed user accounts.

The output of blocks 802, 804, and 806 can be used to identify seed servers that are associated with the topic at block 808. Servers for which the topic has been declared by a user account have been declared by the user account to be associated with the topic. Servers that have a high percentage of messages that are associated with the topic are also likely to be associated to some degree with that topic. And servers that have user accounts as members where the user accounts post a high percentage of their messages that are associated with the topic are also likely to be associated to some degree with that topic.

Since not all servers that are associated with a topic are easy to identify, the method 800 can use the information about user accounts from the user account embedding space, and information about servers from the server embedding space to identify servers that are harder to identify as being associated with a topic. A server might be harder to identify as being associated with a topic when the server is misclassified, or when the server previously was devoted to another topic but the topic of the server has shifted, or unclassified servers, or new servers, etc. According to some examples, the method includes identifying second servers that are associated with the topic at block 810. For example, the data analytics service 118 illustrated in FIG. 1 may identify second servers that are associated with the topic by analyzing one or more embedding spaces. In some examples, identifying the second servers can be performed by a machine learning algorithm that utilizes data from one or embedding space s and the seed servers to identify second servers (additional servers beyond the seed servers) that are associated with the topic.

Figure 9:
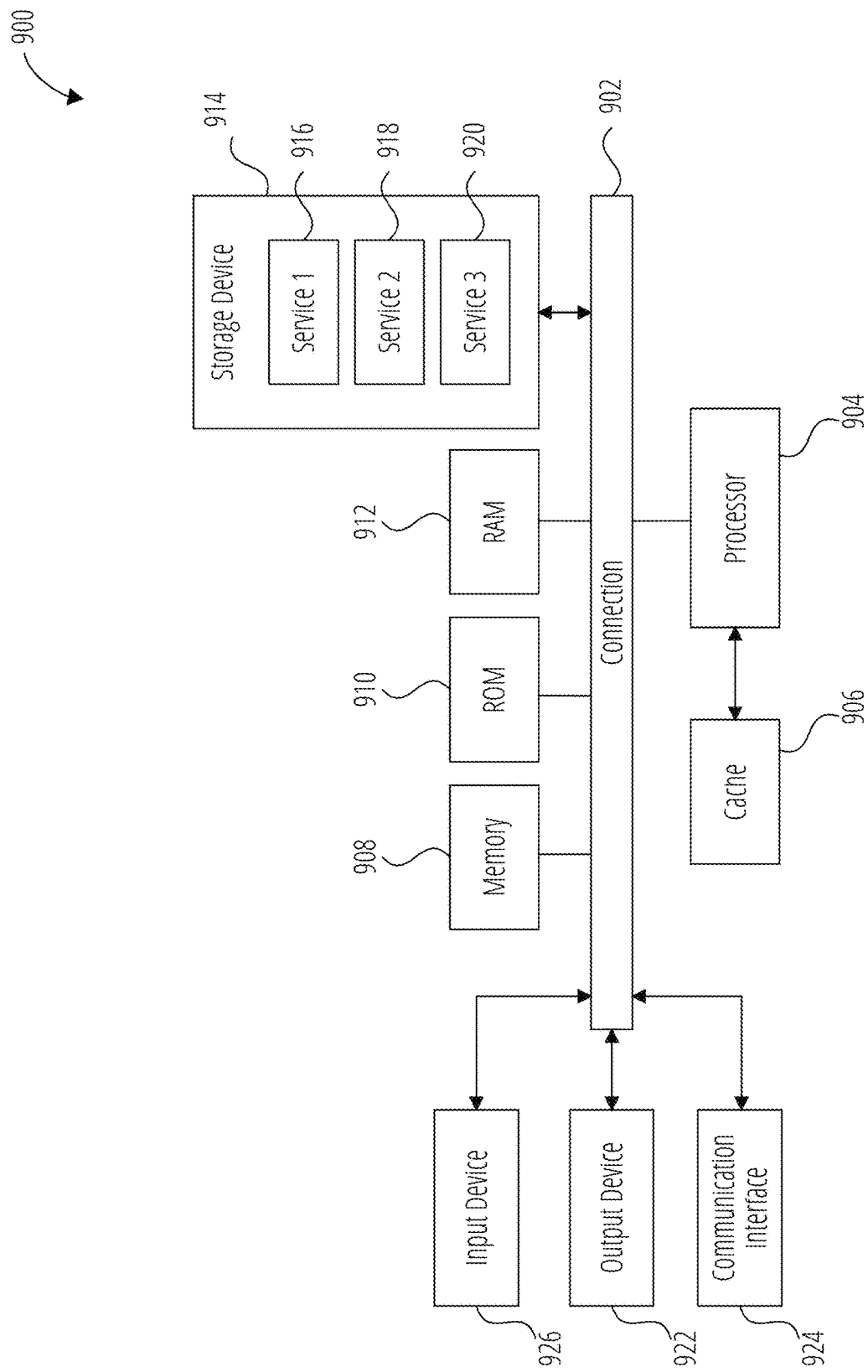
FIG. 9 shows an example of a computing system for implementing some aspects of the present technology.

FIG. 9 shows an example of computing system 900, which can be for example any computing device making up client application 104, community hosting service 102, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc.

Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method comprising: creating a plurality of embedding spaces including a first embedding space and a second embedding space, the first embedding space being a representation of a plurality of entities of a first entity type, the second embedding space being a representation of a plurality entities of a second entity type, wherein the first entity type and the second entity type co-exist in a social graph; inputting data from at least one of the plurality of embedding spaces into a model configured to classify entities as likely to be associated with an explored characteristic; and receiving an output from the model including a classification of entities that are likely associated with the explored characteristic.

Aspect 2. The method of Aspect 1, wherein the inputting the data from the at least one of the plurality of embedding spaces into the model configured to classify entities further comprises: inputting first data from the first embedding space and second data from the second embedding space into the model configured to classify entities, wherein the model configured to classify entities is configured to relate the plurality of entities of the first entity type to the plurality of entities of the second entity type to classify entities as likely to be associated with the explored characteristic.

Aspect 3. The method of any of Aspects 1 to 2, wherein the classification of entities are likely to be associated with the explored characteristic includes outputting a probability that a respective entity is associated with the explored characteristic.

Aspect 4. The method of any of Aspects 1 to 3, wherein the classification of entities are likely to be associated with the explored characteristic includes outputting a binary conclusion that a respective entity is likely associated with the explored characteristic or not likely associated with the explored characteristic.

Aspect 5. The method of any of Aspects 1 to 4, wherein the creating the plurality of embedding spaces includes: generating a vectors to represent entities of a type of entity, wherein a single vector is generated to represent individual respective entities of the type of entity; embedding the vectors in an embedding space, wherein vectors representing individual entities that are similar are placed closer together than vectors representing individual entities that are less similar.

Aspect 6. The method of any of Aspects 1 to 5, wherein the embedding the vectors in the embedding space is performed using an unsupervised machine learning algorithm configured to arrange the vectors representing individual entities that are similar closer together than vectors representing individual entities that are less similar.

Aspect 7. The method of any of Aspects 1 to 6, wherein unsupervised machine learning algorithm is an unsupervised contrastive learning algorithm.

Aspect 8. The method of any of Aspects 1 to 7, further comprising training the model the unsupervised machine learning algorithm configured to arrange the vectors further comprises: representing entities from at least one of the plurality of embedding spaces as a vector that identifies a first entity, a second entity, and a relationship between the entities and inputting the vector into the model; configuring the unsupervised machine learning algorithm to arrange the embedding space to optimize for a parameter.

Aspect 9. The method of any of Aspects 1 to 8, wherein the parameter is optimized by one of ranking loss, logistic, or softmax.

Aspect 10. The method of any of Aspects 1 to 9, wherein the parameter is optimized by ranking loss which is a triplet margin loss that optimizes related entities to be nearby each other in their embedding space, and unrelated entities to be further away.

Aspect 11. The method of any of Aspects 1 to 10, wherein the vector identifies the entity and the entity's relationship to another entity, and the another entity.

Aspect 12. The method of any of Aspects 1 to 11, wherein example entity types include user accounts, channels, servers, bots, messages, events, etc.

Aspect 13. The method of any of Aspects 1 to 12, wherein the first entity type in the first embedding space is user accounts, and the vector relates user accounts to other user accounts, channels, or servers.

Aspect 14. The method of any of Aspects 1 to 13, wherein the model is configured to identify user accounts associated with a user that is associated with a characteristic, the method further comprising: training a supervised machine learning model to identify messages including content indicative of the characteristic, wherein the supervised machine learning model is trained using a supervised process that encourages correct predictions of messages including content indicative of the characteristic; identifying messages including content indicative of the characteristic by the supervised machine learning model; identifying seed user accounts, wherein a seed user account is one in which a number of messages originating from a respective user account including content indicative of the characteristic is greater than a threshold number of messages; selecting user accounts in the first embedding space, wherein the first embedding space is a representation of the user account entity type, that are proximate to the seed user accounts, the proximity of the selected user accounts to the seed user accounts indicates that the selected user accounts are likely to originate messages including content indicative of the characteristic.

Aspect 15. The method of any of Aspects 1 to 14, wherein the characteristic is that the user originates messages reflecting an intent to self-harm.

Aspect 16. The method of any of Aspects 1 to 15, wherein the characteristic is that the user originates messages subject to content moderation rules.

Aspect 17. The method of any of Aspects 1 to 16, further comprising: subjecting a message received from the user account to higher standards for content filtering when the user account sending the message is associated with the characteristic.

Aspect 18. The method of any of Aspects 1 to 17, further comprising: suspending the user account when user account is likely to originate messages including content indicative of the characteristic.

Aspect 19. The method of any of Aspects 1 to 18, wherein the model is configured to identify channels or servers associated with a user that is associated with a characteristic, the method further comprising: training a machine learning model to identify channels or servers indicative of the characteristic, wherein the machine learning model is trained using a supervised process that encourages correct predictions of channels or servers associated with the characteristic; identifying seed channels or seed servers associated with the characteristic using the machine learning model; selecting channels or servers in the second embedding space, wherein the second embedding space is a representation of the channel or the server entity type, that are proximate to the seed channels or servers, the proximity of the selected channels or servers to the seed channels or servers indicates that the selected channels or servers are likely to be associated with the characteristic.

Aspect 20. The method of any of Aspects 1 to 19, wherein the characteristic is that the channel or server receives messages associated with self harm, bully, hate speech, spam, scams, etc.

Aspect 21. The method of any of Aspects 1 to 20, wherein the characteristic is that the channel or server is related to a topic.

Aspect 22. The method of any of Aspects 1 to 21, further comprising: subjecting a message received from a user account for posting in the channel or server to higher standards for content filtering when the channel or server that is a target of the message is associated with the characteristic.

Aspect 23. The method of any of Aspects 1 to 22, further comprising: suspending the channel or server when the channel or server is associated with the characteristic.

Aspect 24. The method of any of Aspects 1 to 23, wherein the model is configured to identify user accounts associated with a characteristic, the method further comprising: identifying user accounts that are indicative of the characteristic; identifying servers that include user accounts or messages associated with the characteristic; training a supervised machine learning model using a supervised process that encourages correct predictions of user accounts that are likely to be associated with the characteristic based on an analysis of the first embedding space and the second embedding space.

Aspect 25. The method of any of Aspects 1 to 24, wherein the characteristic is that the user originates messages reflecting an intent to self-harm.

Aspect 26. The method of any of Aspects 1 to 25, wherein the characteristic is that the user originates messages subject to content moderation rules.

Aspect 27. The method of any of Aspects 1 to 26, further comprising: subjecting a message received from the user account to higher standards for content filtering when the user account sending the message is associated with the characteristic.

Aspect 28. The method of any of Aspects 1 to 27, further comprising: suspending the user account when user account is likely to originate messages including content indicative of the characteristic.

Aspect 29. The method of any of Aspects 1 to 28, wherein the model is configured to identify channels or servers that have user accounts that are likely to post messages associated with a characteristic, the method comprising: identifying user accounts that post greater than a threshold number of messages associated with the characteristic; identifying servers having user accounts as that post the greater than the threshold number of messages associated with the characteristic; training a supervised machine learning model using a supervised process that encourages correct predictions of servers that are likely include user accounts that post messages associated with the characteristic based on an analysis of the first embedding space and the second embedding space.

Aspect 30. The method of any of Aspects 1 to 29, wherein the characteristic is that the channel or server receives messages associated with self harm.

Aspect 31. The method of any of Aspects 1 to 30, wherein the characteristic is that the channel or server is related to a topic.

Aspect 32. The method of any of Aspects 1 to 31, further comprising: subjecting a message received from a user account for posting in the channel or server to higher standards for content filtering when the channel or server that is a target of the message is associated with the characteristic.

Aspect 33. The method of any of Aspects 1 to 32, further comprising: suspending the channel or server when the channel or server is associated with the characteristic.

What is claimed is:

1. A method for classifying different types of social network entities that are likely to be associated with social network content indicative of a characteristic based on vector data from a plurality of embedding spaces each with arrangements of vectors representing social network entities of a shared entity type, the method comprising:
    creating, by a first machine-learning model that arranges certain vectors representing social network entities that are similar closer together than other vectors representing social network entities that are less similar, a plurality of embedding spaces including vectors representing social network entities of a first shared entity type in a first embedding space and vectors representing social network entities of a second shared entity type in a second embedding space, wherein arrangement of respective vectors in the first embedding space is based on references in related social network entities represented by respective vectors of the second embedding space, wherein the first shared entity type and the second shared entity type co-exist in a social graph;
    inputting vector data from the first embedding space and vector data from the second embedding space into a second machine-learning model configured to relate the plurality of social network entities of the first entity type to the plurality of social network entities of the second entity type to classify respective social network entities as likely to be associated with social network content indicative of a characteristic; and
    receiving an output from the second machine-learning model including a classification of entities that are likely associated with the social network content indicative of the characteristic.

2. The method of claim 1, wherein the creating the plurality of embedding spaces includes:
    generating vectors to represent respective social network entities of a type of entity, wherein a vector is generated to represent an individual respective entity of the type of entity; and
    embedding the vectors in an embedding space.

3. The method of claim 2, wherein the first entity type in the first embedding space is user accounts, and the vector relates user accounts to other user accounts, channels, or servers.

4. The method of claim 1, wherein the second machine-learning model is configured to identify user accounts associated with a user that is associated with the characteristic, the method further comprising:
training a supervised machine learning model to identify messages including the content indicative of the characteristic, wherein the supervised machine learning model is trained using a supervised process that encourages correct predictions of messages including the social network content indicative of the characteristic;
identifying messages including the social network content indicative of the characteristic by the supervised machine learning model;
identifying seed user accounts, wherein a seed user account is one in which a number of messages originating from a respective user account including the social network content indicative of the characteristic is greater than a threshold number of messages; and
selecting user accounts in the first embedding space, wherein the first embedding space is a representation of a user account entity type, that are proximate to the seed user accounts, the proximity of the selected user accounts to the seed user accounts indicates that the selected user accounts are likely to originate messages including the social network content indicative of the characteristic.

5. The method of claim 4, further comprising:
subjecting a message received from the selected user account to higher standards for content filtering when the selected user account sending the message is associated with the characteristic.

6. The method of claim 1, wherein the second machine-learning model is configured to identify channels or servers associated with a user that is associated with the characteristic, the method further comprising:
training a machine learning model to identify channels or servers indicative of the characteristic, wherein the machine learning model is trained using a supervised process that encourages correct predictions of channels or servers associated with the characteristic;
identifying seed channels or seed servers associated with the characteristic using the machine learning model; and
selecting channels or servers in the second embedding space, wherein the second embedding space is a representation of a channel entity type or a server entity type, that are proximate to the seed channels or servers, the proximity of the selected channels or servers to the seed channels or servers indicates that the selected channels or servers are likely to be associated with the characteristic.

7. The method of claim 6, further comprising:
performing an action associated with the selected channels or servers in the second embedding space, wherein the action is to classify at least one of the selected channels or servers with the characteristic or to recommend the at least one of the selected channels or servers to a user account interested in channels or servers associated with the characteristic.

8. The method of claim 1, wherein the second machine-learning model is configured to identify user accounts associated with the characteristic, the method further comprising:

identifying user accounts that are indicative of the characteristic;
identifying servers that include user accounts or messages associated with the characteristic; and
training a supervised machine learning model using a supervised process that encourages correct predictions of user accounts that are likely to be associated with the characteristic based on an analysis of the first embedding space and the second embedding space.

9. The method of claim 1, wherein the second machine-learning model is configured to identify channels or servers that have user accounts that are likely to post messages associated with a characteristic, the method comprising:
identifying user accounts that post greater than a threshold number of messages associated with the characteristic;
identifying servers having user accounts as that post the greater than the threshold number of messages associated with the characteristic; and
training a supervised machine learning model using a supervised process that encourages correct predictions of servers that are likely include user accounts that post messages associated with the characteristic based on an analysis of the first embedding space and the second embedding space.

10. A computing apparatus for classifying different types of social network entities that are likely to be associated with social network content indicative of a characteristic based on vector data from a plurality of embedding spaces each with arrangements of vectors representing social network entities of a shared entity type, the computing apparatus comprising:
a processor; and
a memory storing instructions that, when executed by the processor, configure the apparatus to:
create, by a first machine-learning model that arranges certain vectors representing social network entities that are similar closer together than other vectors representing social network entities that are less similar, a plurality of embedding spaces including vectors representing social network entities of a first shared entity type in a first embedding space and vectors representing social network entities of a second shared entity type in a second embedding space, wherein arrangement of respective vectors in the first embedding space is based on references in related social network entities represented by respective vectors of the second embedding space, wherein the first shared entity type and the second shared entity type co-exist in a social graph;
input vector data from the first embedding space and vector data from the second embedding space into a second machine-learning model configured to relate the plurality of social network entities of the first entity type to the plurality of social network entities of the second entity type to classify respective social network entities as likely to be associated with social network content indicative of a characteristic; and
receive an output from the second machine-learning model including a classification of respective social network entities that are likely associated with the social network content indicative of the characteristic.

11. The computing apparatus of claim 10, wherein the creating the plurality of embedding spaces includes:
generate the vectors to represent respective social network entities of a type of entity, wherein a single vector is generated to represent individual respective social network entities of the type of entity, the vector identifies a first social network entity, a second social network entity, and a relationship between the respective social network entities; and embed the vectors in an embedding space.

12. The computing apparatus of claim 10, wherein the second machine-learning model is configured to identify user accounts associated with a user that is associated with the characteristic, wherein the instructions further configure the apparatus to:

train a supervised machine learning model to identify messages including the content indicative of the characteristic, wherein the supervised machine learning model is trained using a supervised process that encourages correct predictions of messages including the social network content indicative of the characteristic;

identify messages including the social network content indicative of the characteristic by the supervised machine learning model;

identify seed user accounts, wherein a seed user account is one in which a number of messages originating from a respective user account including the social network content indicative of the characteristic is greater than a threshold number of messages; and select user accounts in the first embedding space, wherein the first embedding space is a representation of a user account entity type, that are proximate to the seed user accounts, the proximity of the selected user accounts to the seed user accounts indicates that the selected user accounts are likely to originate messages including the social network content indicative of the characteristic.

13. The computing apparatus of claim 10, wherein the second machine-learning model is configured to identify channels or servers associated with a user that is associated with a characteristic, wherein the instructions further configure the apparatus to:

train a machine learning model to identify channels or servers indicative of the characteristic, wherein the machine learning model is trained using a supervised process that encourages correct predictions of channels or servers associated with the characteristic;

identify seed channels or seed servers associated with the characteristic using the machine learning model; and select channels or servers in the second embedding space, wherein the second embedding space is a representation of the channel or the server entity type, that are proximate to the seed channels or servers, the proximity of the selected channels or servers to the seed channels or servers indicates that the selected channels or servers are likely to be associated with the characteristic.

14. The computing apparatus of claim 10, wherein the second machine-learning model is configured to identify channels or servers that have user accounts that are likely to post messages associated with a characteristic, wherein the instructions further configure the apparatus to:

identify user accounts that post greater than a threshold number of messages associated with the characteristic;

identify servers having user accounts as that post the greater than the threshold number of messages associated with the characteristic; and train a supervised machine learning model using a supervised process that encourages correct predictions of servers that are likely include user accounts that post messages associated with the characteristic based on an analysis of the first embedding space and the second embedding space.

15. A non-transitory computer-readable storage medium, the computer-readable storage medium comprising instructions that when executed by a computer, cause the computer to:

create, by a first machine-learning model that arranges certain vectors representing social network entities that are similar closer together than other vectors representing social network entities that are less similar, a plurality of embedding spaces including vectors representing social network entities of a first shared entity type in a first embedding space and vectors representing social network entities of a second shared entity type in a second embedding space, wherein arrangement of respective vectors in the first embedding space is based on references in related social network entities represented by respective vectors of the second embedding space, wherein the first shared entity type and the second shared entity type co-exist in a social graph;

input vector data from the first embedding space and vector data from the second embedding space into a second machine-learning model configured to relate the plurality of social network entities of the first entity type to the plurality of social network entities of the second entity type to classify respective social network entities as likely to be associated with social network content indicative of a characteristic; and receive an output from the second machine-learning model including a classification of entities that are likely associated with the social network content indicative of the characteristic.

16. The computer-readable storage medium of claim 15, wherein the creating the plurality of embedding spaces includes:

generate the vectors to represent respective social network entities of a type of entity, wherein a single vector is generated to represent individual respective social network entities of the type of entity, the vector identifies a first social network entity, a second social network entity, and a relationship between the respective social network entities; and embed the vectors in an embedding space.

17. The computer-readable storage medium of claim 16, wherein the first entity type in the first embedding space is user accounts, and the vector relates user accounts to other user accounts, channels, or servers.

* * * * *